United States Patent [19]

Jaquiss

[11] 3,945,967
[45] Mar. 23, 1976

[54] THERMALLY STABLE POLYCARBONATE COMPOSITION

[75] Inventor: Donald B. G. Jaquiss, New Harmony, Ind.

[73] Assignee: General Electric Company, Pittsfield, Mass.

[22] Filed: Oct. 7, 1974

[21] Appl. No.: 512,434

[52] U.S. Cl................. 260/45.8 A; 260/45.7 P
[51] Int. Cl.² ............................... C08J 3/20
[58] Field of Search ............ 260/45.8 A, 45.7 P

[56] References Cited
UNITED STATES PATENTS

| | | | |
|---|---|---|---|
| 3,498,946 | 3/1970 | Calkins | 260/37 |
| 3,839,247 | 10/1974 | Bialous et al. | 260/18 |

*Primary Examiner*—V. P. Hoke
*Attorney, Agent, or Firm*—Donald M. Papuga; William F. Mufatti

[57] ABSTRACT

A thermally stable polycarbonate composition comprising in admixture, an aromatic carbonate polymer and a stabilizing amount of an additive which is a combination of an epoxy compound prepared from an epichlorodydrin and the reaction product of an alkyl phosphite and the chlorine containing contaminant in said epoxy compound.

4 Claims, No Drawings

THERMALLY STABLE POLYCARBONATE COMPOSITION

This invention is directed to a thermally stable polycarbonate composition comprising in admixture, an aromatic carbonate polymer and a stabilizing amount of an additive which is the combination of an epoxy compound prepared from an epichlorodydrin and the reaction product of an alkyl phosphite and the chlorine containing contaminant in said epoxy compound.

BACKGROUND OF THE INVENTION

It is known to incorporate various phosphites with polymers as disclosed in U.S. Pat. No. 3,305,520 and phosphites with tetraaryl tin as shown in Canadian Pat. No. 727,700. However, these references deal solely with phosphites such as triaryl and trialkyl phosphites. Due to increased molding temperatures and use temperatures of molded shapes of polycarbonates, it is increasingly more important to prepare polycarbonates having increased stability to thermal degradation or discoloration due to elevated temperatures.

Epoxy compounds have been known to provide stabilization for polycarbonates as disclosed in an application of C. A. Bialous et al. entitled "A Hydrolytically Stable Polycarbonte Composition", Ser. No. 427,832 filed Dec. 26, 1973 now U.S. Pat. No. 3,839,247, issued Oct. 1, 1974 and assigned to the same assignee as the present invention.

However, it has been found that the epoxy compounds prepared from epichlorodydrin described in the C. A. Bialous et al. application normally contain significant amounts of chlorine as an impurity which results in poor molded color of polycarbonate compositions containing these particular epoxy compounds.

These polycarbonate compositions are suitable for producing bottles which are free of the drawbacks of hazing and brittleness of clear polycarbonate bottles when subjected to water or moisture under elevated temperatures.

In the art, there are several patents directed to using epoxies with polycarbonates. One such patent is U.S. Pat. No. 3,489,716, which specifically discloses employing with a polycarbonate a cycloaliphatic epoxy containing 1-2-cycloaliphatic rings. Another patent is U.S. Pat. No. 3,634,312, which discloses the use of a great host of epoxies that can be used with a copolycarbonate and specifically poly(bisphenol-A-carbonate-co-phosphite).

DESCRIPTION OF THE INVENTION

It has been surprisingly discovered that a thermally stable polycarbonate composition having excellent molded color results by admixing an aromatic carbonate polymer and an additive which is the combination of an epoxy compound prepared from an epichlorohydrin and the reaction product of an alkyl phosphite and the chlorine contaminant in said epoxy compound.

The epoxides that may be employed in the practice of this invention are those prepared from epichlorohydrin and are either aromatic epoxy or aliphatic epoxy compounds represented by the following formula:

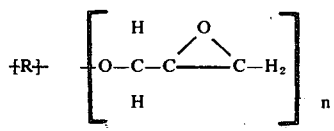

wherein R is selected from the group consisting of alkyl radicals of 1 to 24 carbonatoms, aryl radicals containing 1 to 3 aromatic rings and n is an integer of from 1 to about 10.

Specifically, the epoxies that can be employed herein are bisphenol-A diglycidyl ether, tetrabromo bisphenol-A diglycidyl ether, phloroglucinol tri-clycidyl ether, hydroquinone diglycidyl ether bromoresorcinol diglycidyl ether, tetrahydroxybiphenyl tetraglycidyl ether. Preferably, the epoxy compound employed herein the practice of this invention is bisphenol-A diglycidyl ether.

The alkyl phosphite is represented by the following formula:

$$P(OR_1)_3$$

wherein $R_1$ is an alkyl radical of from 1 to about 10 carbon atoms. These alkyl phosphites are such that they are volatile and thus easily removed by mild heating.

The epoxy compound prepared from epichlorohydrin contains chlorine as an impurity. This impure epoxy compound is reacted with an alkyl phosphite according to the following equation, taking triethyl phosphite as an example of the phosphite:

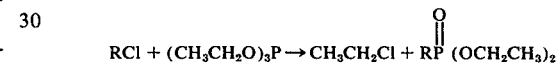

wherein R is defined as above. This reaction is the Arbuzov reaction and is well known to those skilled in the art. As seen from the above equation, chlorine is removed as the volatile ethyl chloride.

The amount of additive combination employed is a stabilizing amount and can vary from 0.01 to about 0.50 weight percent based on the weight of the polycarbonate.

The aromatic carbonate polymers employed in the practice of this invention are homopolymers and copolymers that are prepared by reacting a dihydric phenol with a carbonate precursor.

The dihydric phenols that can be employed are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2-2-bis (4-hydroxy-3,5-dichlorophenyl) propane, 2,2-bis(4-hydroxy-3,5-dibromophenyl) propane, etc., dihydric phenol ethers such as bis(4-hydroxyphenyl) ether, bis(3,5-dichloro-4-hydroxyphenyl) ether, etc.: dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, etc. A variety of additional dihydric phenols are also available to provide carbonate polymers and are disclosed in U.S. Pat. Nos. 2,999,835; 3,028,365, and 3,153,008. Also suitable for preparing the aromatic carbonate polymers are copolymers prepared from any of the above copolymerized with halogen-containing dihydric phenols such as 2,2- bis(3,5-dichloro-4-hydroxyphenyl) propane, 2,2-bis(3,5-dibromo-4-hydroxyphenyl) propane, etc. It is of course possible to employ two or more different dihydric phenols or a copolymer of a dihydric phenol with a gylcol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

Also included are the polymeric materials of a dihydric phenol, a dicarboxylic acid and carbonic acid. These are disclosed in U.S. Pat. No. 3,169,121 which is incorporated herein by reference.

The aromatic carbonate polymers of this invention are prepared by employing a molecular weight regulator, an acid acceptor and a catalyst. The molecular weight regulators which may be employed in carrying out the process of this invention include phenol, cyclohexanol, methanol, para-tertiarybutylphenol, para-bromophenol, etc. Preferably phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The organic acid acceptor may be one which can be either a hydroxide, a carbonate, a bicarbonate, or a phosphate or an alkali or alkali earth metal.

Obviously other materials can also be employed with the aromatic carbonate polymer of this invention and include such materials as anti-static agents, pigments, mold release agents, thermal stabilizers, ultraviolet light stabilizers, reinforcing fillers and the like.

The composition of this invention is prepared by admixing the aromatic carbonate polymer with the additives of the instant invention.

DESCRIPTION OF THE PREFERRED EMBODIMENT

The following examples are set forth to illustrate more clearly the principle and practice of this invention to those skilled in art. Unless otherwise specified, where parts or percents are mentioned, they are parts or percents by weight.

EXAMPLE I

To a reactor fitted with a reflux condenser and mechanical agitator charge 100 parts of methylene chloride, 150 parts of 2,2-bis(4-hydroxyphenyl)propane, 150 parts of calcium hydroxide, 3 parts of phenol and 0.018 parts of triethylamine. The slurry is stirred and phosgene is added at a rate of about 90 parts per hour. After 50 minutes, the phosgene addition is terminated. The polycarbonate in solid form is recovered by filtering and removal of any residual solvent. The product is dried over night at 125°C. The product is then fed to the extruder which is at a temperature of about 525°F and pelletized.

EXAMPLE II

To the polymer prepared in Example I before pellitizing, 0.1 weight percent of bisphenol-A diglycidyl ether is blended therewith and the blend is then pelletized as in Example I.

EXAMPLE III

To the polymer prepared in Example I before pelletizing, 0.1 weight percent of bisphenol-A diglycidyl ether which has been treated with triethylphosphite, is blended therewith and the blend is then pelletized as in Example I.

PROCEDURE A

The treated bisphenol-A diglycidyl ether of Example III is prepared by taking 50 parts of bisphenol-A diglycidyl ester and heating it with 1 part of triethylphosphite.

Each of the polymer compositions of Examples I–III are injection molded into test samples of about 3 inches by 2 inches by ⅛ inch thick at about 650°F. The samples are subjected to ASTM test method D1003 for determining light transmission on the samples before and after steam autoclaving for 16 hours at 260°F. The higher the percent light transmitted, the better is the clarity of the sample. Also, the samples are subjected to ASTM Yellowness Index Test 1925-63T. The lower the value, the better is the clarity of the sample.

The results are as follows:

TABLE

| Sample | Yellowness Index | % Light Transmission Before Autoclaving | % Light Transmission After Autoclaving |
|---|---|---|---|
| I | 5.4 | 86.2 | 54.1 |
| II | 27.1 | 77.1 | 74.3 |
| III | 2.1 | 86.6 | 83.1 |

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A thermally stable polycarbonate composition comprising in admixture, an aromatic carbonate polymer and a stabilizing amount of an additive which is a combination of an epoxy compound prepared from an epichlorohydrin and represented by the following formula:

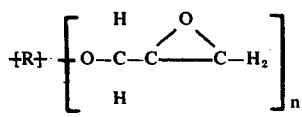

wherein R is selected from the group consisting of alkyl radicals of 1 to 24 carbon atoms, aryl radicals containing 1 to 3 aromatic rings and n is an integer of from 1 to about 10, and the reaction product of the chlorine containing contaminant in said epoxy compound and an alkyl phosphite represented by the following formula:

$$P(OR_1)_3$$

wherein $R_1$ is an alkyl radical of from 1 to about 10 carbon atoms; the reactants being employed in such proportions as to form the volatile alkyl chloride derivative from said contaminant and the alkyl radical of the phosphite.

2. The composition of claim 1 wherein the epoxy compound is bisphenol-A diglycidyl ether.

3. The composition of claim 1 wherein the phosphite is triethylphosphite.

4. The composition of claim 1 where the aromatic carbonate polymer is the reaction product of a dihydric phenol and a carbonate precursor.

* * * * *